J. TAPANI.
HOSE COUPLING.
APPLICATION FILED JUNE 5, 1914.

1,146,822.

Patented July 20, 1915.
2 SHEETS—SHEET 1.

Witnesses

Inventor
John Tapani,
By Victor J. Evans
Attorney

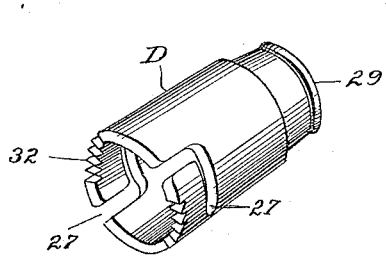
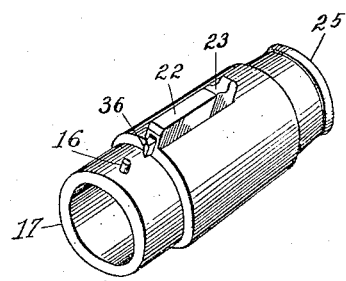
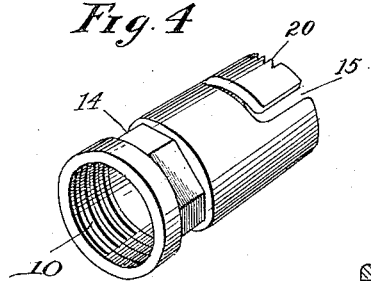
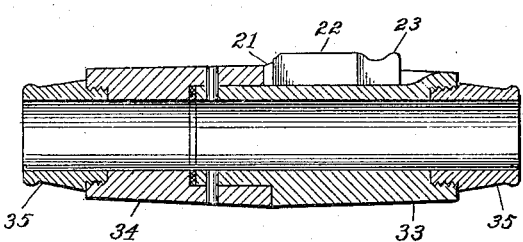
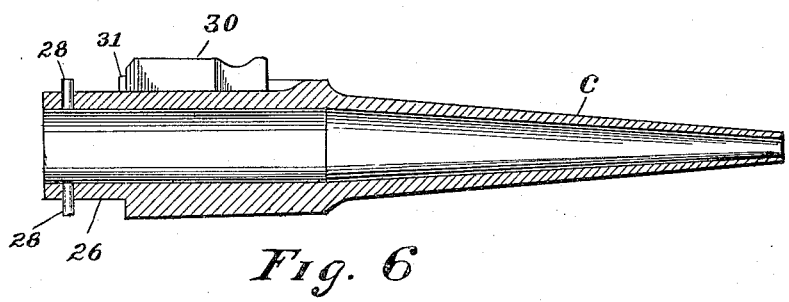

UNITED STATES PATENT OFFICE.

JOHN TAPANI, OF DIORITE, MICHIGAN.

HOSE-COUPLING.

1,146,822.

Specification of Letters Patent.

Patented July 20, 1915.

Application filed June 5, 1914. Serial No. 843,233.

*To all whom it may concern:*

Be it known that I, JOHN TAPANI, a citizen of the United States, residing at Diorite, in the county of Marquette and State of Michigan, have invented new and useful Improvements in Hose-Couplings, of which the following is a specification.

The invention relates to hose couplings, and more particularly to the class of detachable joints for use in a fire hose.

The primary object of the invention is the provision of a joint or coupling wherein the sections of a hose can be quickly and easily joined together and also the said hose fastened to the hydrant or water plug.

Another object of the invention is the provision of a joint or coupling, which is of novel form to prevent the leakage of water at the joints between the sections of the hose or at the plug or hydrant.

A further object of the invention is the provision of a joint or coupling of this character which can be readily locked to prevent the separation of the sections of the hose at the joint, and also which will enable the convenient handling of the said sections of the hose for the joining or uncoupling thereof.

A still further object of the invention is the provision of a joint or coupling which is simple in construction, reliable and efficient in its purpose, strong, durable, and inexpensive in manufacture.

With these and other objects in view, the invention consists in the construction, combination and arrangement of parts as will be hereinafter fully described, illustrated in the accompanying drawings, and pointed out in the claim hereunto appended.

Figure 1:
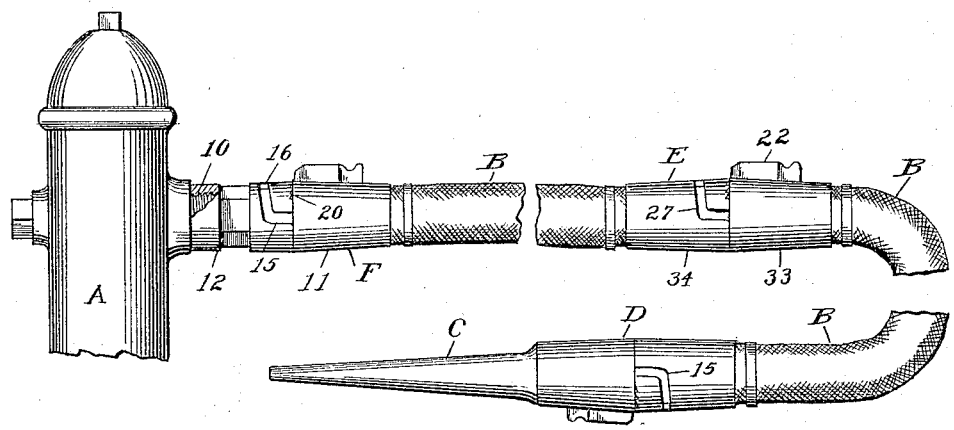
Figure 2:
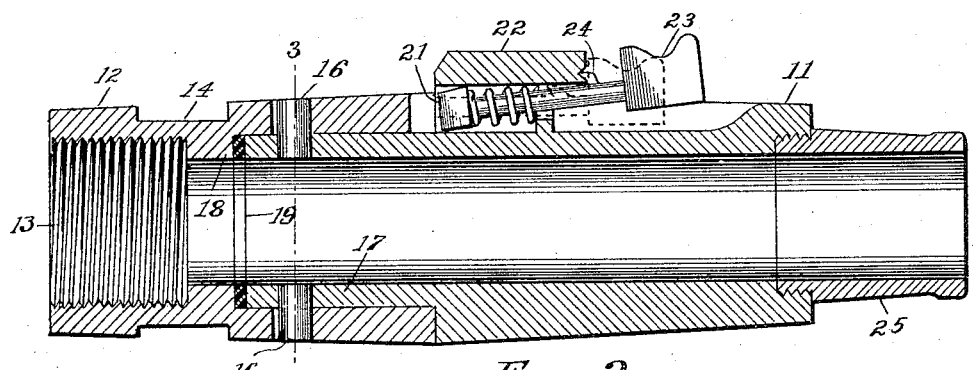
Figure 3:
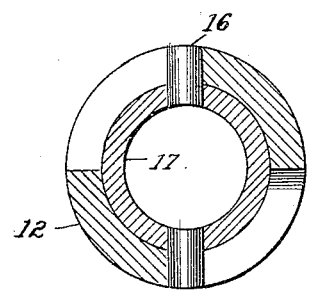

In the drawings:—Figure 1 is an elevation of a water plug or hydrant and hose, showing the joints or couplings each constructed in accordance with the invention, the hose being partly broken away at intervals. Fig. 2 is an enlarged vertical longitudinal sectional view through one of the couplings or joints. Fig. 3 is a vertical transverse sectional view taken along the line 3—3 of Fig. 2. Fig. 4 is a perspective view of one member of the coupling or joint. Fig. 5 is a similar view of the other member of the coupling or joint. Fig. 6 is a vertical longitudinal sectional view through the coupling or joint for the nozzle of the hose. Fig. 7 is a vertical longitudinal sectional view through another joint or coupling in the hose. Fig. 8 is a perspective view of the female member 12 of the coupling F.

Similar reference characters indicate corresponding parts throughout the several views in the drawings.

Referring to the drawings in detail, A designates a portion of a water hydrant or plug, B the sections of a hose, which may be of any required length, C the nozzle, D the coupling or joint therefor, E the coupling or joint between the sections of the hose, and F the coupling or joint for connecting the hose to the hydrant or plug, the said couplings or joints being hereinafter fully described.

The hydrant or plug is formed with an externally threaded nipple 10, to which is detachably connected the coupling F, comprising the male and female members 11 and 12 respectively, the latter being formed at one end with an internal thread 13 for engaging the thread on the nipple 10 to join the said member thereto, while formed exteriorly of this member 12 are wrench engaging surfaces 14 which permit the easy connection of the member to the nipple. At the opposite end of the member 12 are formed diametrically opposed substantially L-shaped slots 15, the inner stretches of which are slightly angularly disposed for the locking engagement therein of lugs or pins 16 mounted in or formed integral with the reduced end portion 17 of the member 11, the said lugs being diametrically opposite each other on the reduced end 17, while held within the member 12 against an annular shoulder 18 formed by the slotted end is a gasket 19 so that on the joining of the members 11 and 12 the same will be rendered water-tight to prevent leakage. The member 12 in the end through which the slots 15 open is formed with ratchet teeth 20 with any one of which is adapted to engage a spring pressed locking bolt 21 held within a guide housing 22 on the member 11, the bolt 21 being formed with a hand knob 23 which permits the retracting of the bolt against the resistance of the spring acting thereon for the unlocking of the same. The bolt is formed with a shoulder 24 which is adapted to engage the housing 22 when the said bolt is pulled outwardly away from the member 11 to sustain it in released position, thus permitting the uncoupling of the members 11 and 12 if desired. The member 11 has detachably threaded therein a sleeve 25 which is suitably secured in the section B of the hose for the joining of the latter to the said member 11 of the coupling F.

The nozzle C is formed with a reduced end 26 to be inserted within the coupling D, which at one end is formed with the substantially L-shaped slots 27 in which are detachably engaged the pins or lugs 28, and these slots 27 and lugs 28 are identical to the construction of the slots 15 and the lugs 16 hereinbefore set forth. The coupling D has detachably threaded therein a sleeve 29 which is fastened within the section B adjacent to the nozzle C of the hose in any suitable manner. Mounted upon the nozzle C is a housing 30 in which is arranged a spring-held locking bolt 31, the same being adapted to engage the ratchet teeth 32 on the coupling D, and this bolt 31 is constructed and operated in a manner similar to the bolt 21 hereinbefore described.

The coupling E comprises male and female members 33 and 34 respectively, the same being identical in construction with respect to the members 11 and 12 hereinbefore described in detail, that is to say, with regard to the locking together and unlocking of the members from each other, and also the joining of the same. These members 33 and 34 have detachably engaged therein the sleeves 35, which are fastened to the sections B of the hose in any suitable manner. It will be noted that each spring bolt 21 and 31 are formed at their locking ends with a beveled face 36 which permits the riding of the said bolt over the ratchet teeth for the automatic locking engagement thereof with the same when coupling the members of the coupling or joint together.

From the foregoing it is thought that the construction and manner of use of the device will be clearly understood, and therefore a more extended explanation has been omitted.

What is claimed is:—

A coupling comprising male and female members, said female member being provided with substantially L-shaped slots diametrically opposite each other, lugs on the male member for engagement in the slots, a sleeve-like housing formed on the male member, a locking bolt slidably fitted within the housing and adapted to engage with one edge of the female member, a spring acting upon the bolt to normally hold the same in locking position, and a hook-like shoulder formed on the bolt and engageable with the housing to hold the said bolt retracted against the tension of the spring for the unlocking of the male and female members.

In testimony whereof I affix my signature in presence of two witnesses.

JOHN TAPANI.

Witnesses:
 ALEX. PANTTI,
 KONSTER SAASTAMAINESS.

Copies of this patent may be obtained for five cents each, by addressing the "Commissioner of Patents, Washington, D. C."